United States Patent [19]

Leonard

[11] 4,100,755

[45] Jul. 18, 1978

[54] ABSORPTION REFRIGERATION SYSTEM UTILIZING SOLAR ENERGY

[75] Inventor: Louis H. Leonard, DeWitt, N.Y.

[73] Assignee: Carrier Corporation, Syracuse, N.Y.

[21] Appl. No.: 752,034

[22] Filed: Dec. 20, 1976

[51] Int. Cl.² .................. F25B 27/00; F25B 15/00; F25B 27/02

[52] U.S. Cl. .................................. 62/2; 62/148; 62/238; 62/476

[58] Field of Search ............ 62/113, 513, 2, 501, 62/505, 148, 476, 497, 238

[56] References Cited

U.S. PATENT DOCUMENTS

| | | | |
|---|---|---|---|
| 3,389,574 | 6/1968 | McGrath | 62/476 |
| 3,495,420 | 2/1970 | Loweth et al. | 62/476 |
| 3,530,684 | 9/1970 | Porter | 62/148 |
| 3,575,012 | 4/1971 | Peckham | 62/476 |
| 3,590,593 | 7/1971 | Miner | 62/148 |
| 3,651,655 | 3/1972 | Dyre | 62/148 |
| 3,739,594 | 6/1973 | Freese | 62/476 |
| 3,824,804 | 7/1974 | Sandmark | 62/238 |
| 3,989,183 | 11/1976 | Gustafsson | 62/238 |
| 4,023,375 | 5/1977 | Chinnappa et al. | 62/2 |
| 4,028,078 | 6/1977 | Peckham | 62/476 |

*Primary Examiner*—Lloyd L. King
*Attorney, Agent, or Firm*—J. Raymond Curtin; John S. Sensny

[57] ABSTRACT

An absorption refrigeration system having a primary condenser-generator unit powered by solar energy, or any other suitable relatively low temperature energy source. A secondary condenser-generator unit is operatively connected to the primary unit. The secondary unit is powered by a refrigerant circuit arranged to move the heat of condensation developed in the secondary condenser into the secondary generator. The secondary condenser-generator unit is used to either augment or supplement the primary combination.

18 Claims, 3 Drawing Figures

ABSORPTION REFRIGERATION SYSTEM UTILIZING SOLAR ENERGY

BACKGROUND OF THE INVENTION

This invention relates to absorption refrigeration and, in particular, to an absorption system for efficiently utilizing low temperature energy.

More specifically, this invention relates to a solar powered absorption refrigeration system. Because of the nature of solar energy, a secondary or back-up source of energy is usually required to either augment or supplement the solar power during those periods when solar energy is either totally unavailable or only partially available. Typically, a secondary source of energy is provided by a conventional energy source, such as natural gas, steam or electrical energy. However, with natural gas and oil being in short supply, the use of these conventional energy sources, even on a back-up or standby basis, becomes prohibitive. Reconcentration of solution by electric resistance heating has always been very costly and impractical.

SUMMARY OF THE INVENTION

It is therefore an object of the present invention to improve solar power absorption refrigeration systems.

A further object of the present invention is to augment a solar powered refrigeration system with an extremely efficient electrically driven secondary generator.

Yet another object of the present invention is to provide a solar powered refrigeration machine capable of making maximum use of all available solar energy while, at the same time, augmenting the cooling demands of the machine with a highly efficient secondary source of energy.

These and other objects of the present invention are attained in an absorption refrigeration system having a primary solar powered generator-condenser unit operatively connected to a secondary generator-condenser unit, a compresser driven refrigerant circuit having a first heat exchanger located in the secondary condenser and a second heat exchanger located in the secondary generator, the refrigerant circuit being arranged to move the heat of condensation from the secondary condenser into the secondary generator whereby the heat of condensation is efficiently utilized to reconstitute the absorptive solution contained in the secondary generator.

BRIEF DESCRIPTION OF THE DRAWINGS

For a better understanding of the present invention as well as other objects and further features thereof, reference is had to the following detailed description of the invention to be read in connection with the accompanying drawings wherein.

DESCRIPTION OF THE PREFERRED EMBODIMENT

The present invention will be described in reference to an absorption refrigeration system suitably arranged for utilizing solar energy as a primary source of power to the system generator. It should be clear, however, that any other source of low temperature energy, such as normally unrecovered heat energy produced by many manufacturing processes or geothermal sources can be employed in a similar manner in the practice of the present invention. Similarly, the present invention shall also be described in conjunction with an absorption system in employing water as a refrigerant and lithium bromide as an absorbtive solution. However, it is not necessarily confined to this particular selection of working substances.

Figure 1:
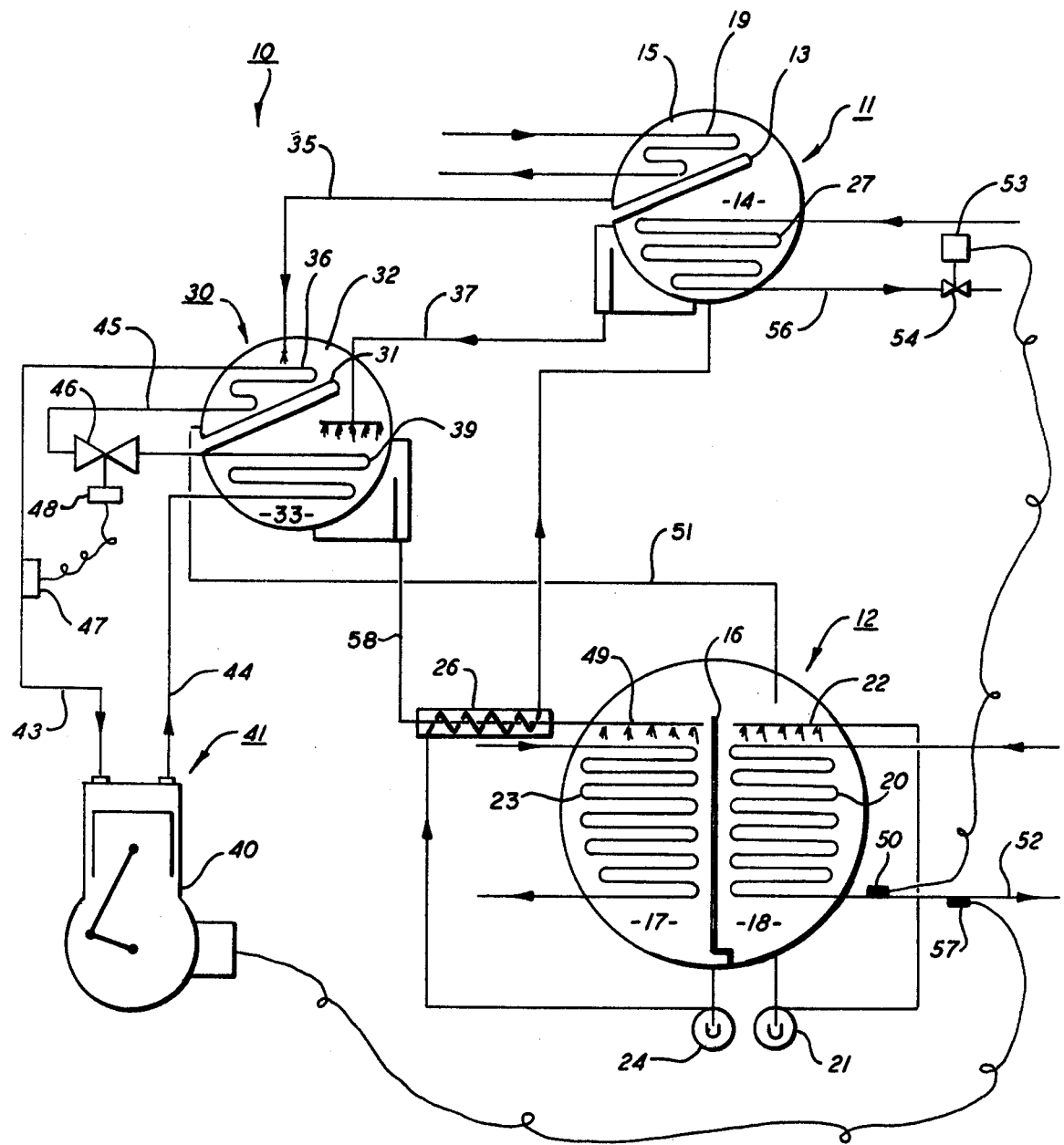
FIG. 1 illustrates a first embodiment of the present invention showing a primary solar powered condenser-generator unit operatively connected to a secondary condenser-generator unit driven by a heat pump.

Referring now to FIG. 1, there is illustrated an absorption refrigeration system 10 including an upper shell, generally referenced 11, and lower shell generally referenced 12. As is conventional in many absorption machines, the upper shell is divided into two sections by a partition 13, the sections including a generator section 14 and a condenser section 15. The two particular sections associated with upper shell 11 will be herein referred to as the primary condenser section and the primary generator section. Similarly, the lower shell is also separated by a partition 16 into an absorber section 17 and an evaporator chiller section 18.

As is typical in most lithium bromide systems, the atmosphere contained within the system is established by the vapor pressure of the solution within that particular shell, and the boiling point of the refrigerant (water) is brought to a corresponding low saturated pressure-temperature level. To do this, the machine must be thoroughly purged of non-condensables.

A substance to be chilled, such as brine or water, is passed through the chiller coil 20 located in evaporator 18. Typically, low temperature refrigerant is drawn from the sump of the evaporator section by means of a pump 21 and directed over the chiller coil by means of a spray header 22 operatively connected to the discharge side of the pump. As the low temperature refrigerant flows over the coils, it partially evaporates and absorbs heat energy from the chilled substance passing through the coil causing the substance to become cooled. The portion of the refrigerant evaporated during the chilling process passes over the top of partition 16 and enters the absorber. In the absorber, the refrigerant vapor is exposed to a concentrated solution of lithium bromide whereby the vapors are absorbed and condensed within the solution. Cooling water, delivered from a cooling tower or the like, is passed through a coil 23 and serves to carry the heat of absorption and condensation out of the system. As the lithium bromide continues to absorb refrigerant vapors in the absorber section, the solution becomes diluted or weakened in its ability to absorb more refrigerant. The weak solution is drawn from the lower portion of the absorber section by means of solution pump 24 and pumped upwardly into the primary generator 14 where it is reconcentrated for reuse in the process. While in transit between the absorber section and the primary generator section, the weak solution passes through a solution heat exchanger 26, the function of which shall be explained in greater detail below.

Reconcentration of the solution within the primary generators is carried out by bringing the solution into heat transfer relationship with a heated substance passing through the generator heating coil 27. In the present embodiment it is contemplated that hot water or steam generated from solar heated water will be utilized as the working substance passing through the generator coil. However, as pointed out above, the primary source of energy utilized in the practice of the present invention can be generated from any readily available, typically low temperature source such as waste heat produced by many known manufacturing processes. At the relatively low pressures involved, refrigerant condensed within the solution is driven off as a vapor. The vapor, in turn, is allowed to pass over partition 13 and into the condenser section 14 of the primary unit. Water generally delivered from a cooling tower or the like, is passed through cooling coil 19 within the condenser section. The circulating cooling water absorbs heat from the refrigerant vapor reducing it to a liquid condensate. The condensate, in turn, drains into the lower portion of the primary condenser section as illustrated.

Normally, where sufficient energy is present to sustain continuous generator operations, the reconcentrated solution is delivered back into the absorber, through a secondary generator 33 the function of which shall be explained below. It should be noted at this point, however, that no additional work is performed in the secondary generator under these conditions.

However, as in the case of the solar application, where the amount of primary energy available to power the primary generator can vary periodically or even be nonexisting, a secondary source of energy must be provided to sustain or take over the generator operation. To this end, a secondary condenser-generator unit 30 is herein provided which, as will be explained below, is operatively connected to the primary unit. The secondary unit is arranged to act in concert with the primary unit so that the refrigerant system can continually meet load demands regardless of the state or amount of primary energy available. The present absorption system also has the unique ability to make maximum use of all available primary energy while at the same time minimizing consumption of secondary energy.

As illustrated in FIG. 1, a partition 31 separates shell 30 into a secondary condenser section 32 and a secondary generator section 33. The shell housing the secondary sections is positioned at an elevation intermediate that of the primary condenser-generating unit and the absorber-evaporator unit. Condensate collected in the sump of the primary condenser is gravity fed via line 35 directly into the secondary condenser section where it is exposed to heat exchanger 36. Depending on operating conditions, it may flash cool itself, making this cycle more efficient. Similarly solution collected in the primary generators is gravity fed into the secondary generator by means of a line 37. A second heat exchange 39 is located in the secondary generator.

The two heat exchangers 36, 39 are operatively connected to a mechanical compressor, such as reciprocating centrifugal, rotary or screw compressor 40, to form a refrigerant circuit 41, capable of transferring the heat of condensation developed within the seconday condenser into the secondary generator where it is utilized to reconcentrate the solution contained therein. The heat of compression developed by the compressor balances out with the heat of solution required to reconcentrate the solution. The suction side of the compressor is connected to exchanger 36 by means of refrigerant line 43 while the discharge end of the compressor is connected to exchanger 39 by means of refrigerant line 44. The opposite ends of the two exchangers are also interconnected by means of a line 45 thus completing a closed loop circuit through which refrigerant flows. A throttling valve 46 is operatively connected within line 45 which serves to control the flow of refrigerant through the circuit between the high pressure and low pressure sides thereof sensing the amount of superheat in the suction gas as a means of control.

The position of the control valve 46 is regulated in response to the temperature of the superheated refrigerant vapor passing through the compressor suction line. A sensor 47 is operatively affixed to the suction line and is arranged to send a temperature indicative signal to a valve regulator 48 which, in turn, opens or closes a throttling valve in response to the temperatures sensed.

Liquid condensate collected in the secondary condenser is gravity fed via line 51 into the top portion of the evaporator section 18 where it is discharged into the stream of refrigerant issuing from spray header 22. Similarly, solution collected in the sump of the secondary generator is passed through the previously noted solution heat exchanger 26 via line 58. In the exchanger the refrigerant gives up energy to the lower temperature solution being pumped from the absorber into the primary generator. After passing from the solution heat exchanger, the strong solution is delivered into the absorber section spray header 49 from where it is directed over the cooling water coil 23. As noted above, the cooling water circulating through the coil absorbs the energy generated during the absorption process and carries this energy out of the system.

The operation of the absorption system is regulated in reference to the temperature of the chilled substance passing out of the chiller 20. A first temperature sensor 50 is affixed to the coil outlet line 52 and is arranged to send a temperature indicative signal to regulator 53. The regulator, in turn controls a valve 54 located in the hot water discharge line 56 associated with primary generator heating coil. The control valve is opened or closed to vary the amount of energy provided to the generator in response to the temperature of the chilled substance leaving the evaporator. When solar generated heat is insufficient to sustain the cooling demands on the system, that is when control valve 54 is fully opened and the temperature of the chilled substance leaving the evaporator rises above a predetermined level, a signal is generated by second temperature sensor 57 which is also operatively connected to the chilled water line. The temperature signal in turn is used to actuate the mechanical compressor in the refrigerant circuit thus placing the secondary condenser-generator unit in operation. With the secondary generator in operation, the primary generator also continues to operate to extract as much energy as possible from the solar heated working substance. As a result, weak solution in the primary generator is partially reconcentrated or, alternatively, just preheated prior to being delivered into the secondary generator thereby extracting as much work as possible from the primary generator when a low level of primary energy is available. As noted above, with the mechanical compressor in operation, the flow of refrigerant through the refrigerant circuit is controlled independently by means of the control valve. The temperature level maintained within the secondary generator, however, does not have to be set at any given level provided that the temperature difference between the temperature maintained in the heat exchanger 39 and the boiling point of the solution in the generator is such that the refrigerant circuit possesses the ability of continually meeting the entire system cooling load.

Figure 2:
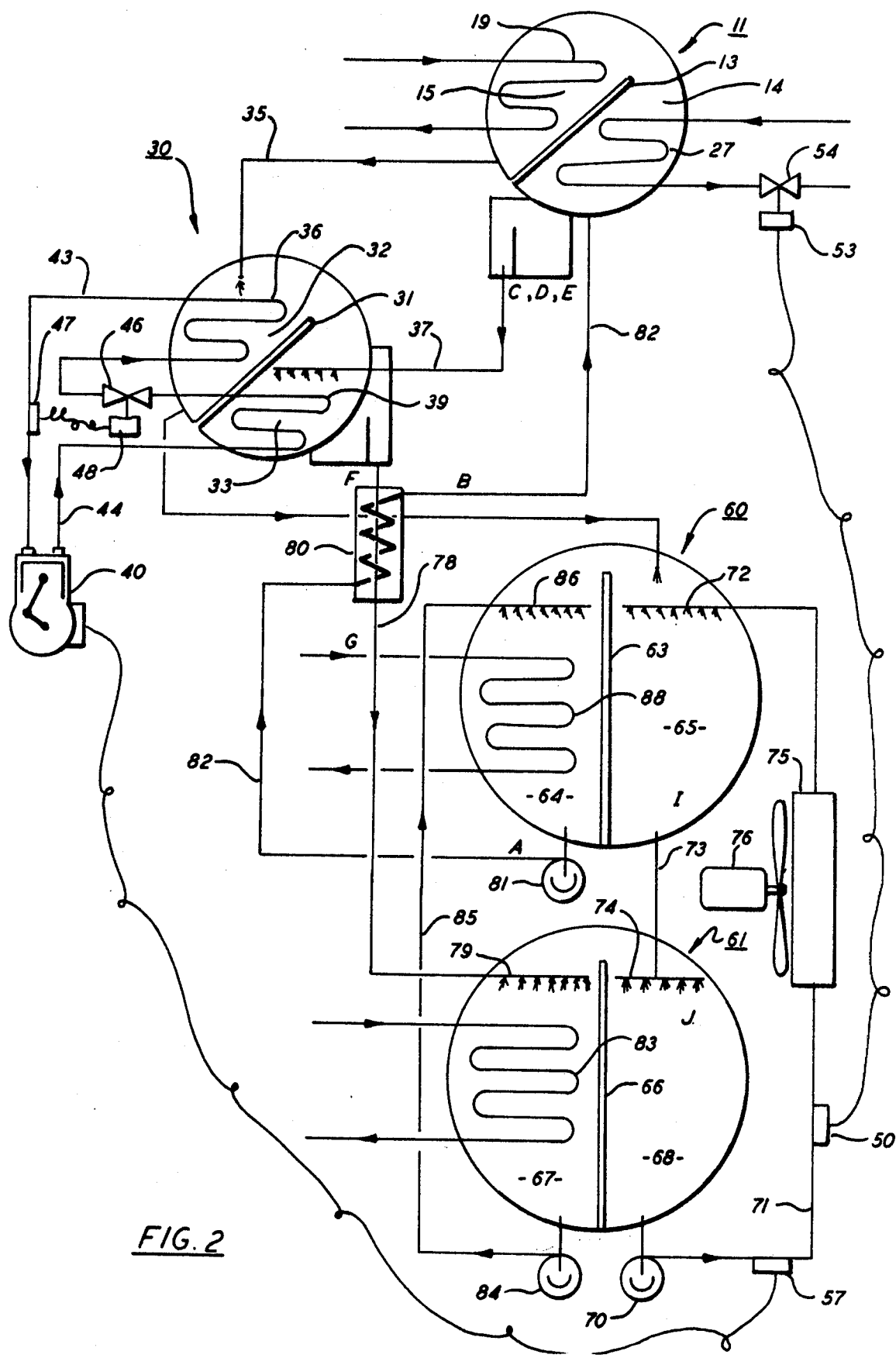
FIG. 2 represents a second embodiment of the present invention wherein the absorbtive refrigeration system employs a staged counterflow absorber-evaporator section whereby the system is capable of operating at low solution concentrations and temperatures making it more attractive for low temperature solar heated water applications.

Referring now to FIG. 2, there is shown a second embodiment of the invention in which the heat exchanger coil in the evaporator section of the machine is eliminated thereby eliminating the temperature penalty normally associated with heat exchanger surface losses which, in turn, allows the machine to operate at lower solution concentrations and temperatures. As shown in FIG. 2, the primary and secondary condenser-generator units are as described above in reference to FIG. 1 with like numbers depicting like components contained therein. The two above noted units act in concert as explained above with reconcentrated solution being collected in the sump of the secondary generator and liquid refrigerant being collected in the sump of the secondary condenser.

The absorber and evaporator sections in the present embodiment are contained in two separate shells, a high temperature shell 60 and a low temperature shell 61 located immediately below the high temperature shell. As explained above, the upper shell is separated into two sections by a partition 63, a high temperature absorber section 64 and a high temperature evaporator 65. Similarly, the lower shell 61 is separated by partition 66 into low temperature absorber section 67 and a low temperature evaporator 68.

A refrigerant pump 70 is located beneath the low temperature evaporator section which serves to circulate refrigerant sometimes referred to as a "live brine," from the low temperature, and thus low pressure, evaporator into the high temperature and pressure evaporator via refrigerant line 71. While in transit, the low temperature refrigerant is passed through a sensible heat exchanger coil 75 air conditioning coil, having a fan unit 76 associated therewith for moving air across or through the coil. The refrigerant passing through the air conditioning coil absorbs sensible heat and also dehumidifies the air moving thereover thereby raising the liquid refrigerant temperature. The warm refrigerant is next sprayed into the high temperature evaporator by means of spray header 72 located in the upper portion thereof. The upper evaporator section is maintained at a higher pressure than the lower section and, as a result, the refrigerant is flash cooled at a higher temperature as it issues from the spray header. The refrigerant is adiabatically flash cooled to the absorber pressure. Flash cooled refrigerant collected in the sump of the high temperature evaporator is gravity fed via line 73 into a second spray header 74 located in the low pressure evaporator section 68. Here again, the refrigerant is flash cooled to an even lower temperature. Although some of the refrigerant is vaporized by the double expansion, a perponderance of the refrigerant remains unevaporated while the heat of evaporation is absorbed by the solution with the flashed refrigerant. In practice, an extremely small percentage of the total refrigerant present is absorbed in the two absorbers (high and low temperatures) thereby making most of the refrigerant available to sustain the refrigeration process in the air conditioning coil 75.

Reconcentrated solution that is collected within the secondary generator is fed via a solution line 78 into a spray header 79 located in the low pressure absorber. Prior to entering the absorber, the solution is passed through solution heat exchanger 80. Within the solution heat exchanger sensible cooling of the solution is carried out by bringing strong solution in heat transfer relationship with the cooler weak solution being pumped upwardly from high pressure absorber 64 into primary generator via a pump 81 and line 82. In the low temperature absorber, the strong solution is sprayed over a cooling coil 83 through which cooling tower water is circulated. As the strong solution passes through the low temperature stage, refrigerant vapor generated in the low temperature evaporator is condensed within the solution. The heat of condensation is carried out of the system via the circulating cooling tower water. The solution is then collected in the bottom portion of the low temperature absorber and is drawn from the low temperature section via pump 84 and passed upwardly into the high temperature absorber section via line 85. Here again the solution is sprayed by means of a header 86 over a second cooling coil 88 through which cooling tower water is also circulated. The refrigerant vapors generated in the high temperature evaporator section are absorbed within the solution further weakening the solution concentration. As noted above, the weak solution is drawn from the bottom of the high temperature absorber section by means of a solution pump 81 and is passed through solution heat exchanger 80 into the primary generator.

By staging the movement of both solution and refrigerant through the absorber-evaporator as herein described, the strong solution in the system is exposed first to refrigerant vapor at the lowest system temperature. This produces relatively low vapor pressure in the absorbent solution and allows the part of the system to operate at comparatively lower evaporation temperatures for a given solution concentration when compared with a more conventional system utilizing a surface heat exchanger in the evaporator section. It should be further noted that the use of absorber section staged in this manner in conjunction with the staged evaporators allows for a wider total concentration spread to be developed within the system resulting in a higher performance when compared with a more conventional system.

Figure 3:
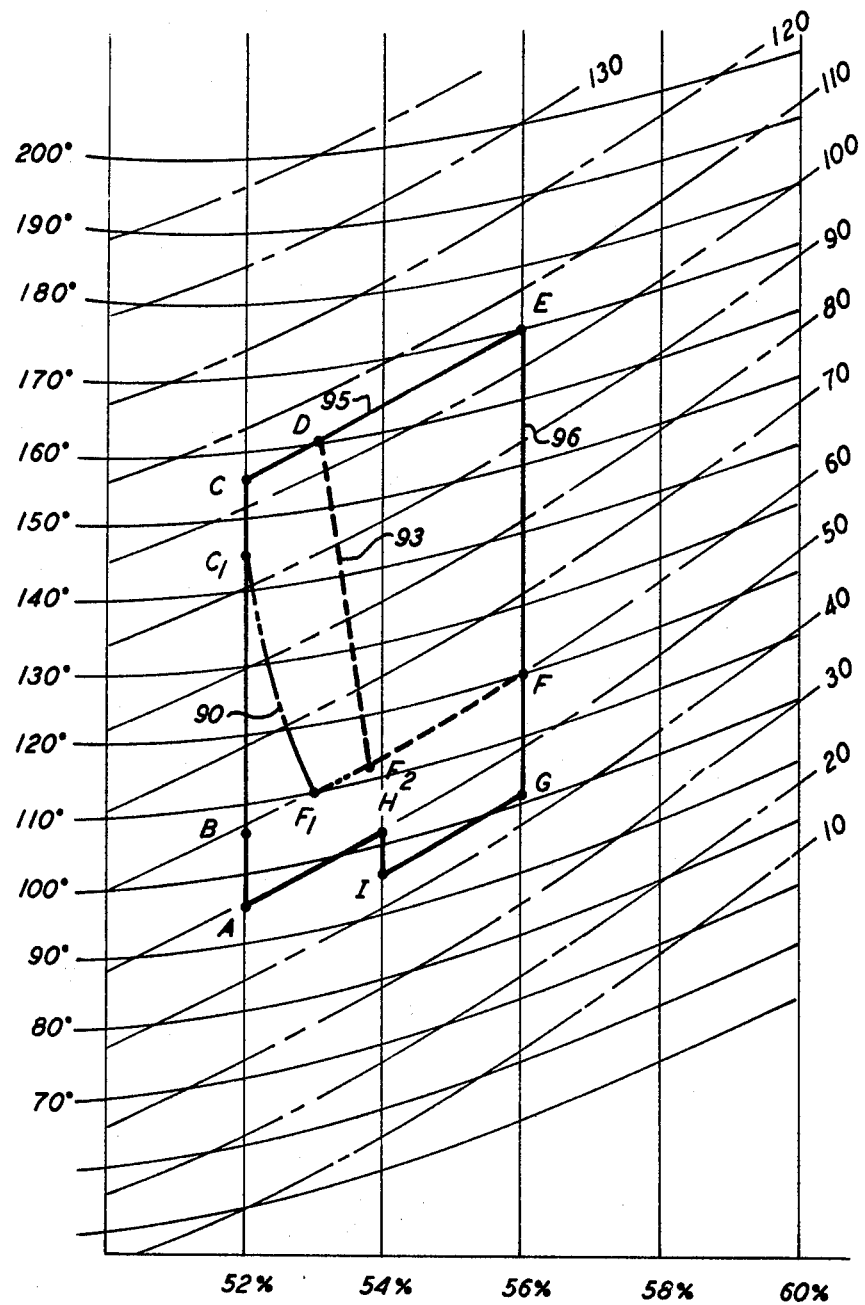
FIG. 3 is a graphic representation of the cycle diagrams associated wth the system shown in FIG. 2.

The operation of the stage counterflow system illustrated in FIG. 2 is further described in conjunction with a typical example with reference to the cycle diagram shown in FIG. 3. The cycle will be described in reference to the various points plotted on the diagram for a typical cycle, the cycle extending from point A through point J. These points, whenever convenient, shall be also noted in FIG. 2 in the approximate location where the cycle point physically takes place.

Referring now to FIGS. 2 and 3, in a staged counter flow system employing lithium bromide and water as the working substances, weak solution at a concentration at about 52 percent and 95° Fahrenheit leaves the high temperature absorber section at point A and is pumped upwardly towards the primary solar powered generator 14. After passing through the solution heat exchanger 80, the temperature of the weak solution is raised to a higher level at point B which is typically about 110° Fahrenheit.

The weak solution is next delivered into the primary generator where it floods the generator coil 27. In the primary generator, the solution can be either preheated, partially reconcentrated or totally reconcentrated depending upon the temperature and availability of the primary source of energy. It should be noted that in any case, the maximum amount of energy available in the primary generator is utilized to produce cooling, a result that is novel in this type of system.

In the case where only preheating of the solution can be effected in the primary generator, the solution temperature is raised to some state or point $C_1$ which is below the boiling point C of the solution for the generator conditions. The preheated solution at state $C_1$ is delivered into second generator 33 which is held at some pressure lower than that maintained in the primary generator. As a result, the preheated solution entering the secondary generator is rapidly expanded to a lower pressure at state point $F_1$ as illustrated by the phantom line 90 shown in FIG. 3. The compressor driven secondary generator functions to raise the temperature of the solution of constant pressure in the generator until point F is reached. At point F, the concentration of the solution is at the desired level of about 56%.

The strong solution at about 56% concentration is collected in the generator and then moved through the solution heat exchanger where heat is given up to the cooler weak solution whereby the temperature of the 56% concentrated solution is reduced to point G. At this time, the strong solution is introduced into the low pressure absorber section. In the low pressure absorber section, the solution absorbs refrigerant vapors from the low temperature evaporator 68 and the concentration is thereby reduced at constant pressure to point I. The solution is then pumped into the spray header associated with the high pressure absorber unit where it is sensibly heated to point H a constant concentration of about 54%. In the high pressure absorber section, the solution is further diluted by refrigerant vapor from high temperature evaporator 65 until the concentration of the solution is reduced to about 52% as depicted at point A. The weakened solution is then drawn from the high pressure and once again recirculated through the solution heat exchanger into the primary generator and the cycle once again repeated.

In the case where the primary generator delivers a bit more energy to produce partially reconcentrated solution, therein the solution is driven to a temperature where it begins to boil. This occurs at point C or at about 160° Fahrenheit. As the solution continues to boil, it reaches point D. The partially reconcentrated solution, as in the case of the previously noted preheated solution, is expanded as it enters the secondary generator whereby the solution is throttled down to state point $F_2$. The throttling process follows the dotted line 93 shown in the diagram of FIG. 3. From $F_2$, the secondary generator adds sufficient energy to the solution to raise the temperature of the reconcentrated solution to state point F or to about 120° at 56% concentration. As the solution moves from the secondary generator to the low temperature absorber, it passes through the solution heat exchanger. Heat is removed from the solution until the temperature of the strongly concentrated solution reaches approximately 100° as noted at state point G. As explained above, the solution is then passed sequentially through the two staged absorber sections in counterflow relationship with the refrigerant moving through the oppositely staged evaporators. Ultimately, the concentration level of the solution reaches the state depicted at state point A.

Lastly, where conditions are such that the primary generator can provide energy to fully reconcentrate the solution, that is, to bring the solution to a concentration of about 56%, the solution is first preheated to a boiling point C in the primary generator and then allowed to continue to boil until it reaches a temperature of about 170° E. This cycle is described by the solid lines 95 and 96 in FIG. 3. The liquid condensate and reconcentrated solution developed in the primary unit is passed directly into the secondary unit. However, sensor 57 in the chiller discharge line 71 senses that temperature of the refrigerant is low enough to hold the compressor 40 inactive. As a result, the reconditioned solution and freed refrigerant passes directly through the secondary unit without further work being performed thereon and is transported via gravity into the absorber-evaporator sections.

By sizing the mechanical compressor so that the heat pump circuit can provide all the energy needed to reconcentrate the solution, that is, sufficient energy to move the solution from state point B to state point F as depicted in FIG. 3, the entire heating needs of the generator can be provided by the heat pump circuit when the primary source of energy is unavailable. In order to produce a 56% lithium bromide solution leaving the secondary generator in the cycle depicted in FIG. 3, the mechanical compressor must develop a lift of about 80°. Sixty degrees of this lift is used to produce a differential temperature between the condensing temperature at state point B and a solution temperature of about 120° found at state point F with a 10° loss at each end for normal heat losses experienced within the heat exchanger. Furthermore, in the staged counterflow cycle, the solution temperature only need be brought to about 170° in either of the generators to meet the normal cooling load typically placed on this type of system. This is a considerably lower tmperature when compared to the approximately 205° solution temperature required in the system depicted in FIG. 1. A net savings of about 35° in solution temperature can be thus realized with use in the stage counterflow system when used in conjunction with the apparatus of the present invention.

While this invention has been described with reference to the details set forth above, the invention is not necessarily confined to these details and shall be covered by the scope of the following claims.

What is claimed is:

1. In an absorption refrigeration system having a primary generator for processing an absorptive solution therein and a primary condenser for condensing refrigerant therein, the improvement comprising a secondary generator operatively connected to the primary generator to receive processed solution from the primary generator, a secondary condenser operatively connected to said primary condenser to receive refrigerant condensate therefrom, and a compression driven refrigeration circuit having a first heat exchanger in heat transfer relation with the refrigerant contained in the secondary condenser and a second heat exchanger in heat transfer relationship with the solution contained within the secondary generator whereby the heat of condensation developed in the secondary condenser is transferred into the secondary generator.

2. The system of claim 1 having control means associated therewith for sensing the temperature of the refrigerant moving between the first and second heat exchangers and regulating the flow of refrigerant through the refrigeration circuit in response thereto.

3. The system of claim 1 further including an absorber arranged to receive reconcentrated solution from the secondary generator and an evaporator for cooling a media being arranged to receive refrigerant from the secondary condenser.

4. The system of claim 3 wherein the compressor employed for driving the refrigeration circuit is a reciprocating compressor.

5. The system of claim 4 having further means for sensing the temperature of media leaving the evaporator and control means responsive to sensed temperature for regulating the operation of said reciprocating compressor.

6. In an absorptive refrigeration system having a primary generator for processing solution therein and a primary condenser for condensing refrigerant, the method of augmenting the energy input to the primary generator including the step of passing condensate collected in the primary condenser into a secondary condenser, passing solution processed in the primary generator into a secondary generator, providing a compressor driven refrigeration circuit for transferring the heat of condensation produced in the secondary condenser into the secondary generator to reconcentrate the solution contained therein.

7. The method of claim 6 further including the steps of delivering the reconcentrated solution from the secondary generator into an absorber and delivering the refrigerant from the secondary condenser into an evaporator for cooling a media.

8. The method of claim 7 further including the step of controlling the operation of the refrigeration circuit compressor in response to the temperature of the media leaving the evaporator.

9. The method of claim 8 further including the step of controlling the flow of refrigerant passing through the refrigeration circuit in response to the temperature of the refrigerant at the inlet to the compressor.

10. The method of claim 6 including the further step of flash cooling the condensate delivered into the secondary condenser.

11. The method of claim 9 including the further step of sizing the compressor so that the heat of compression and the heat of condensation developed in the secondary condenser are sufficient to reconcentrate the solution in the secondary generator when energy is unavailable in the primary generator.

12. A method for efficiently producing cooling in an absorption-refrigeration system including the steps of heating an absorptive solution in a primary generator to a first temperature level which is dependent upon the amount of energy available to said primary generator, condensing refrigerant released in the primary generator to a liquid within a primary condenser, delivering the heated solution from the primary generator into a secondary generator, delivering liquid condensate from the primary condenser into a secondary condenser, producing heat in the secondary generator by means of a compressor driven refrigeration circuit arranged to transfer heat energy from the secondary condenser to the secondary generator, adiabatically flash cooling liquid refrigerant developed in the secondary condenser to a first evaporator maintained at a first pressure, adiabatically flash cooling the refrigerant from the first evaporator chiller in a second evaporator maintained at a second lower pressure, utilizing the flash cooled refrigerant drawn from the second low pressure evaporator to produce cooling, and controlling the operation of the refrigeration circuit compressor in response to the temperature of refrigerant drawn from the second low pressure evaporator.

13. The method of claim 12 further including the steps of delivering solution from the secondary generator into a low pressure absorber which is operatively connected to the second low pressure evaporator, and pumping solution from said low pressure absorber into a second high pressure absorber which is operatively connected to the first high pressure evaporator.

14. The method of claim 13 further including the step of controlling the flow of working fluids through the refrigerant circuit in response to the temperature of the working fluid entering the refrigerant circuit compressor.

15. The method of claim 14 further including the steps of transferring energy between the refrigerant drawn from the low pressure evaporator and a media to be cooled, and returning the refrigerant to the high pressure evaporator.

16. The method of claim 15 further including the step of pumping diluted solution from the high pressure absorber into the primary generator.

17. The method of claim 16 further including the step of transferring energy between the solution developed in the secondary generator and solution pumped into the primary generator prior to flash cooling the solution in the high pressure evaporator.

18. The method of claim 15 further including the step of controlling the amount of heating produced in the primary generator in response to the temperature of the refrigerant drawn from the low pressure evaporator.

* * * * *